United States Patent [19]

Miyake et al.

[11] Patent Number: 4,686,157
[45] Date of Patent: Aug. 11, 1987

[54] FUEL CELL POWER SYSTEM

[75] Inventors: Yasuo Miyake, Neyagawa; Osamu Tajima, Hirakata; Masato Nishioka, Ibaraki; Yasuhiko Itoh, Yawata, all of Japan

[73] Assignee: Sanyo Electric Co., Ltd., Osaka, Japan

[21] Appl. No.: 816,595

[22] Filed: Jan. 6, 1986

[30] Foreign Application Priority Data

Jan. 18, 1985 [JP] Japan .................................... 60-7811

[51] Int. Cl.⁴ ............................................. H01M 8/06
[52] U.S. Cl. .......................................... 429/19; 429/26
[58] Field of Search ..................................... 429/19, 26

[56] References Cited

U.S. PATENT DOCUMENTS 3,801,372  4/1974  Shaw ....................................... 429/26
4,537,839  8/1985  Cameron ................................ 429/26

Primary Examiner—Donald L. Walton
Attorney, Agent, or Firm—Armstrong, Nikaido, Marmelstein & Kubovcik

[57] ABSTRACT

A fuel cell power system comprises a fuel conditioning apparatus for converting hydrocarbon fuels to a hydrogen-rich gas, and a fuel cell stack for converting fuel gas to electric power, said fuel cell stack including an anode gas chamber connected at its inlet to the fuel conditioning apparatus through a fuel gas feed pipe line, a cathode gas chamber connected to a process air feeding means, and a cooling gas chamber connected at its both ends to a cooling medium circulating line provided with a heat exchanger and a blower, characterized in that said fuel gas feed pipe line and cooling medium circulating line are connected one another through a pipe line provided with a valve to supply said hydrogen-rich gas from said fuel gas feed pipe line to said cooling medium circulating line or vice versa.

4 Claims, 4 Drawing Figures

FUEL CELL POWER SYSTEM

BACKGROUND OF THE INVENTION

1. Field of the invention

The present invention relates to a fuel cell power system and, more particularly, a fuel cell power system provided with a fuel conditioning apparatus.

2. Description of the Prior Art

In a fuel cell power system of an indirect type, hydrocarbon fuels are converted to hydrogen-rich gas by a fuel conditioning apparatus or a fuel processer, and then supplied to the fuel cell stack in which energy of electrochemical reaction of fuel gas with oxygen from air is converted into electric power. Since the electric power generated by the fuel cell system depends on a feed rate of the fuel, an amount of the fuel gas supplied to the fuel cell stack must be increased or decreased with variation of the load. It is, however, impossible with the fuel conditioning apparatus to rapidly increase an amount of the generation of fuel gas since the rate of reforming reaction can not be increased rapidly even if an amount of the hydrocarbon fuels fed to the fuel conditioning apparatus is rapidly increased. Accordingly, if and when the load is rapidly increased during light-load running, the feed rate of the fuel gas becomes temporarily short.

In order to overcome this shortcoming, it has been proposed to provide a reservoir tank between the fuel conditioning apparatus and the fuel cell stack. In this system, the hydrogen-rich gas is reserved in the tank to supply a deficient amount of the fuel gas to the fuel cell stack when the load is rapidly increased. However, this system requires provision of a reservoir tank with a large capacity, resulting in excessive size of the system. It has also been proposed to use a fuel conditioning apparatus with a large ability to generate a larger amount of hydrogen-rich gas than the amount required for the operation of the fuel cell stack, and an excess amount of the fuel gas is returned to the fuel conditioning apparatus through a bypass provided with a flow control valve. However, this system causes considerable increase in size of the fuel conditioning apparatus and deterioration of the overall efficiency of the fuel cell power system.

Since the fuel cell reaction is accompanied by generation of heat, some part of the heat of the reaction must be disposed of in order to maintain the working temperature of the fuel cell stack at a predetermined value. For this reason, air is generally used as a cooling medium and fed to the fuel cell stack. However, such a fuel cell system requires use of a large-sized air blower and a large-sized heat exchanger because of low heat conductivity of the air (generally, $2.6 \times 10^{-4}$ W/m-deg), resulting in decrease of the overall efficiency of the fuel cell system.

A phosphoric acid electrolyte fuel cell system is generally operated at a temperature ranging from 180° to 200° C., but the system, when being out of operations, is maintained at a temperature of about 70° C. to prevent the electrolyte from deterioration. Thus, when starting up the the fuel cell system, it is required to heat the fuel cell stack to its working temperature. For this purpose, the process air and/or cooling air in the circulating line is heated by applying an electric power to an electric heater provided on the air-circulating line, or by supplying steam to the heat exchanger arranged in the circulating line. However, the use of electric heaters requires electric power and the use of steam requires an additional steam generating apparatus separate from the steam generating apparatus for supplying steam to the fuel conditioning apparatus.

It is therefore an object of the present invention to overcome the aforesaid disadvantages of the conventional fuel cell power system and to provide an improved fuel cell power system with excellent characteristics in response to load variations and in overall efficiency.

Another object of the present invention is to provide an improved fuel cell power system which makes it possible to use small-sized equipments such as an air blower, without no decrease in performance of the system.

Still another object of the present invention is to provide an improved fuel cell power system that make it possible to start up a fuel cell stack without use of any independent heat generating apparatus.

SUMMARY OF THE INVENTION

These and other objects of the present invention are solved by providing a fuel cell power system comprising a fuel conditioning apparatus for converting hydrocarbon fuels to hydrogen-rich gas, and a fuel cell stack for converting the fuel gas to electric power, said fuel cell stack including an anode gas chamber connected at its inlet to the fuel conditioning apparatus through a fuel gas feed pipe line, a cathode gas chamber connected to a process air feeding means, and a cooling gas chamber connected at its both ends to a cooling medium circulating line provided with a heat exchanger and a blower, characterized in that said fuel gas feed pipe line and cooling medium circulating line are connected one another through a pipe line provided with a valve to supply said hydrogen-rich gas from said fuel gas feed pipe line to said cooling medium circulating line or vice versa.

In a preferred embodiment of the present invention, the valve arranged in the pipe line connected to both the fuel gas feed pipe line and the cooling medium circulating line is adapted to be opened so that a part of the hydrogen-rich gas in the circulating line is supplied to the fuel gas feed pipe line to make up for the shortage of fuel gas to be supplied to the fuel cell stack when a load is rapidly increased.

In another preferred embodiment, the fuel gas feed pipe line is connected at inlet and outlet sides of the blower to the cooling medium circulating line through two pipe lines each being provided with a valve. In this case, the hydrogen-rich gas produced by the fuel conditioning apparatus is supplied to the cooling medium circulating line through the pipe line connected to the inlet side of the blower, while a part of the hydrogen-rich gas in the cooling medium circulating line is supplied to the fuel gas feed pipe line through the pipe line connected to the outlet side of the blower to make up for the shortage of the fuel gas to be supplied to the fuel cell stack when the load is rapidly increased.

In a further preferred embodiment, the valve arranged in the pipe line connected to the fuel gas feed pipe line and the cooling medium circulating line is opened at the start of operation of the fuel cell power system so that the hydrogen-rich gas generated by the fuel conditioning apparatus is supplied as a heating medium to the circulating line through the pipe line connected to the inlet side of the blower till the fuel cell stack is heated up to a temperature at which the fuel cell reaction may be initiated by supply of fuel gas and process air.

In the fuel cell power system according to the present invention, the hydrogen-rich gas is used as the cooling medium in operation, and the cooling medium circulating line serves as a reservoir for the fuel gas. If the load is rapidly increased, a part of the hydrogen-rich gas in the cooling medium circulating line can be supplied to the fuel gas feed pipe line as the fuel gas and then supplied to the fuel cell stack together with the hydrogen-rich gas from the fuel conditioning apparatus. This makes it possible to improve the response to rapid increase of the load.

In addition, since the hydrogen-rich gas has a heat conductivity of $18.2 \times 10^{-4}$ w/(cm-deg) which is higher than that of the air, an amount of the cooling medium can be reduced, thus making it possible to employ small-sized ancillary equipments including a blower and an heat exchanger without no decrease in efficiency of the system. Further, when starting the operation of the system, the hydrogen-rich gas from the fuel conditioning apparatus is used as a heating medium to heat the fuel cell stack, so that the rate of heating can be much increased. The overall efficiency of the system is also improved since there is no need to use an ancillary heat source for heating the fuel cell stack at the starting up of the system.

The invention will be further apparent from the following description with reference to the accompanying drawings which show, by way of example only, a preferred embodiment of the present invention.

DETAILED DESCRIPTION OF THE PREFERRED EMBODIMENT

Figure 1:
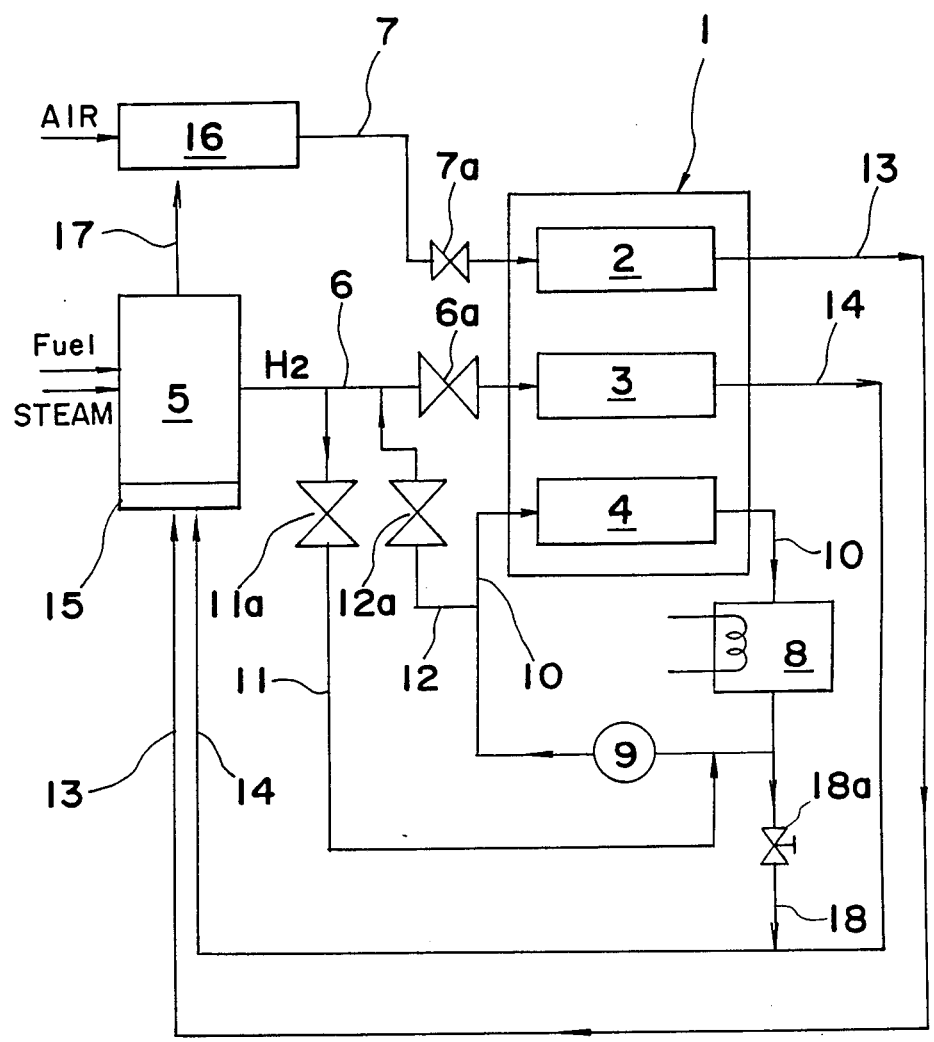
FIG. 1 is a schematic diagram of a fuel cell power system according to the present invention.

Referring now to FIG. 1, there is shown a fuel cell power system according to the present invention which comprises a fuel cell stack 1 and a fuel conditioning apparatus 5. The fuel cell stack 1 is provided with a cathode gas chamber 2, an anode gas chamber 3, and a cooling gas chamber 4. Each chamber is composed of a plurality of channels, and the channels for the cathode gas and those for the anode gas are separated by fuel cells each consisting of electrodes separated by an electrolyte matrix. The cathode gas chamber 2 is connected at its inlet to a process air feeding means 16 such as, for example, a blower or an air compressor via a process air feed pipe line 7 provided with a flow-control valve 7a, and at its outlet to the fuel conditioning apparatus 5 via a pipe line 13. The anode gas chamber 3 is connected at its inlet to the fuel conditioning apparatus 5 via a fuel gas feed pipe line 6 provided with a flow-control valve 6a, and at its outlet to the fuel conditioning apparatus 5 via a pipe line 14.

The cooling gas chamber 4 of the fuel cell stack 1 is connected at its both ends to a cooling medium circulating line 10 provided with a heat exchanger 8 and a blower 9, and constitutes a part of a cooling medium circulating circuit. The circulating line 10 is connected at an inlet side of the blower 9 to the fuel gas feed pipe line 6 through a conduit 11 provided with an inlet valve 11a, and at an outlet side of the blower 9 to the fuel feeding pipe line 6 through a conduit 12 provided with an outlet valve 12a. The circulating line 10 is also connected at the inlet side of the blower 9 to the pipe line 14 through a line 18 provided with a valve 18a.

The fuel conditioning apparatus 5 comprises a reformer (not shown in FIG. 1) in which a hydrocarbon fuel is converted to hydrogen-rich gas by steam reforming reaction, and a shift converter (not shown) in which carbon monoxide in the hydrogen-rich gas is converted to carbon dioxide. The fuel conditioning apparatus 5 is provided with a burner 15 to heat the reformer.

In operation, the valves except for the valves 11a, 12a, and 18a are being opened, and a hydrocarbon fuel and steam are supplied to the fuel conditioning apparatus 5 in which the hydrocarbon fuel is converted to hydrogen-rich gas by steam reforming reaction. The hydrogen-rich gas from the fuel conditioning apparatus 5 is continuously supplied to the anode gas chamber 3 of the fuel cell stack 1 through the pipe line 6, while the process air is sucked or compressed by means of the air feeding mean 16 and continuously supplied to the cathode gas chamber 2 through the pipe line 7.

In the fuel cell stack, electrochemical reaction of the hydrogen-rich gas is taken place to generate electric energy. Prior to the operation of the overall system, the hydrogen-rich gas is charged in the circulating line 10 as the cooling medium by opening the inlet valve 11a at the time of starting up of the system. The hydrogen-rich gas is supplied under pressure by the blower 9 to the cooling chamber 4, where it absorbs heat from the fuel cell stack 1, cooled by the heat exchanger 8, and circulated through the circulating line 10 to maintain the working temperature of the fuel cell stack 1 at a predetermined value, e.g. at 190° C.

When the load is rapidly increased during light-load running, the valve 12a is opened to prevent the anode gas chamber 3 from temporary shortage of the feed rate of fuel gas from the fuel conditioning apparatus 5. If the rapid increase of the load is detected by an system controller, the valve 12a is opened and a part of the hydrogen-rich gas in the circulating line 10 is supplied to the fuel gas feed pipe line 6 through the pipe line 12. Thus, the fuel cell stack 1 is supplied as the fuel with the hydrogen-rich gas from both the fuel conditioning apparatus 5 and the circulating line 10. The valve 12a is closed after the feed rate of the fuel gas from the fuel conditioning apparatus 5 has increased to a level corresponding to the load.

Figure 2A:
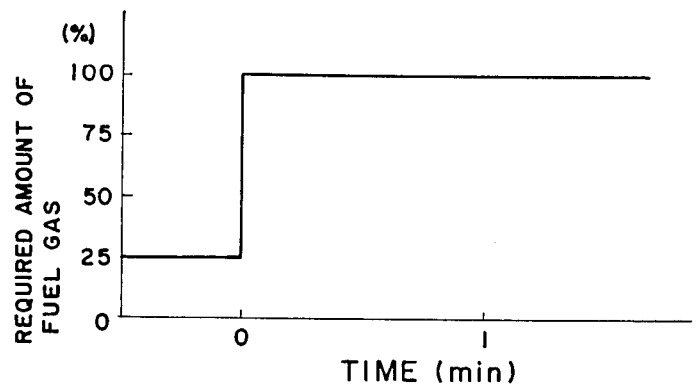
FIG. 2 is a graph showing performance characteristics of the system of FIG. 1.
Figure 2B:
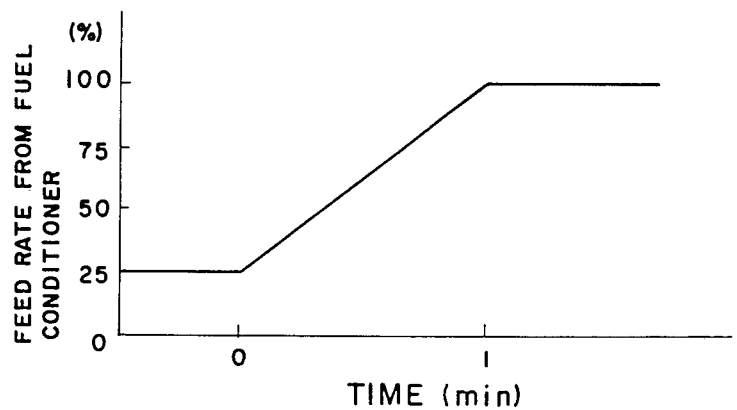
Figure 2C:
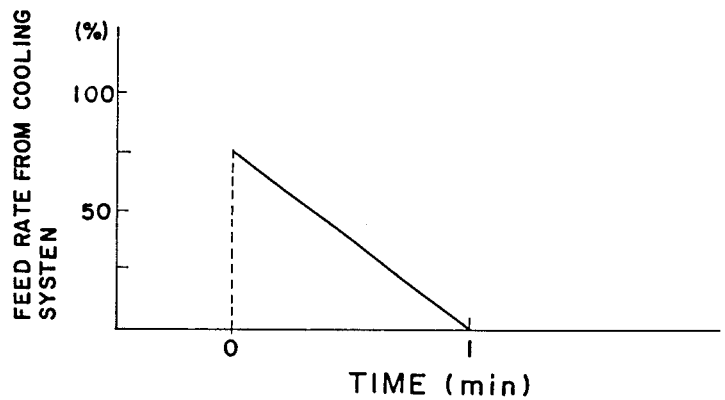

Since the capacity of the circulating circuit 10 is so large as to make up for the shortage of the fuel gas, the hydrogen-rich gas in the circuit 10 can be used as the fuel gas until the feed rate of the fuel gas from the fuel conditioning apparatus 5 is reached to a level corresponding to the load. For example, a fuel cell system with a 100 kw continuous rating requires about 1.75 m$^3$/min of the fuel gas at full-load running, and 0.45 m$^3$/min at 25% load running. If the load is rapidly increased from 25% load to 100% load, there is a shortage of about 1.3 m$^3$/min of the fuel gas, as shown in FIG. 2a. The feed rate of the fuel gas of the apparatus 5 can be increased from 25% load to 100% load within 1 minute, as shown in FIG. 2b. Thus, the amount of the hydrogen-rich gas exhausted from the circulating line 10 is about 0.65 m$^3$, which is a half of the amount of shortage and corresponds to about 13% of the volume of the circulating line (about 5 m$^3$), as shown in FIG. 2C. Thus, the cooling capacity is scarcely affected by the extraction of the cooling medium.

When a surplus hydrogen-rich gas is generated because of decrease of the load, a part of the hydrogen-rich gas flowing through the fuel gas line 6 is supplied to the circulating line 10 through the line 11 by opening the valve 11a to complement the cooling medium. The valve 11a is then closed.

The exhaust gas released from the cathode gas chamber 2 and the exhaust gas released from the anode gas chamber 3 are respectively fed to the burner 15 through the respective pipe lines 13 and 14 to use them as the fuel and combustion air.

If the fuel cell system is of a pressure type, the exhaust gas released from the burner 15 may be fed to a turbine of the air compressor 16 through a pipe line 17 as a power source for the air compressor. In a non-pressure type fuel cell system, the exhaust gas may be used as a heat source for generation of steam to be supplied to the fuel conditioning apparatus 5.

In general, a standing up time of the fuel conditioning apparatus (i.e., a time required for the fuel conditioning apparatus to generate hydrogen-rich gas mixture with a predetermined composition at a predetermined temperature) is about 4 hours, while a standing up time of the fuel cells (i.e., a time required for the fuel cells to generate normal electric power) is a half of that of the former. According to the present invention, the fuel cell stack 1 is firstly heated by the heat of the hydrogen-rich gas generated by the fuel conditioning apparatus 5 over a period of about 1.5 hr, and then heated by the heat of fuel cell reaction.

When starting the fuel cell system, the fuel conditioning apparatus is firstly set working so that a temperature of its output gas or hydrogen-rich gas rises gradually. After the temperature of the hydrogen-rich gas is reached to 160° to 170° C., preferably, 200° C., the valve 11a and the valve 18a in the reflux pipe line 18 are opened to supply the hydrogen-rich gas of an elevated temperature from the fuel conditioning apparatus 5 to the cooling gas chamber 4 of the fuel cell stack 1 through the lines 11 and 10 and the blower 9. A part of the gas released from the outlet of the chamber 4 is exhausted from the circulating line 10 through the line 18 and fed to the burner 15 as the fuel, while the remaining part of the gas is circulated in the line 10 together with the hydrogen-rich gas continuously introduced into the line 10 through the line 11 to heat the fuel cell stack 1 for about 1.5 hr. During this period, the heat exchanger 8 is not operated.

When the temperature of the fuel cell stack 1 is reached to about 130° C., the valve 18a is closed and then the valve 11a is closed so that the predetermined amount of the hydrogen-rich gas is shut in the circulating line 10 as the cooling medium. The valve 6a is then opened to supply the hydrogen-rich gas to the anode gas chamber 3 of the fuel cell stack 1 through the line 6. The valve 7a is also opened to supply the process air to the cathode gas chamber 2. The fuel cell reaction is taken place in the fuel cell stack 1, so that the stack 1 is then heated by the heat of cell reaction. It is, however, to be noted that the fuel cell stack 1 may be heated both by the heat of cell reaction and the heat of the hydrogen-rich gas generated by the fuel conditioning apparatus 5 until the fuel cell stack is heated to the predetermined working temperature. In this case, the valve 11a is maintained in open position and a part of the hydrogen-rich gas is supplied to the fuel cell stack through the line 11a.

If the temperature of the fuel cell stack 1 is reached to its working temperature, the fuel cell system is set to the normal operation.

According to the present invention, it is therefore possible to provide a fuel cell system with excellent characteristics in overall efficiency and response to load variations. It is also possible to use small-sized equipments such as an air blower, without decrease in performance of the system since the hydrogen-rich gas with high heat conductivity can be used as the cooling medium and also as the heating medium.

It will be appreciated that it is not intended to limit the invention to the above example only, many variations, such as might readily occur to one skilled in the art, being possible without departing from the scope of the present invention as defined by the following claims.

What is claimed is:

1. A fuel cell power system comprising a fuel conditioning means for converting hydrocarbon fuels to hydrogen-rich gas, a process air feeding means, and a fuel cell stack means including an anode gas chamber connected at an inlet thereof to the fuel conditioning means, a cathode gas chamber connected to the process air feeding means, and a cooling gas chamber having a cooling medium circulating line including a heat exchanger and a blower, a fuel gas feed line connecting the conditioning means to the inlet of the anode chamber, a first conduit means connecting the cooling medium circulating line to the fuel gas feed line, the first conduit means including a first valve means, and a second conduit means connecting the fuel gas feed line to the cooling medium circulating line, the second conduit means including a second valve means.

2. The fuel cell power system according to claim 1, wherein the first conduit means is connected to an outlet side of the blower of the cooling medium circulating line and the second conduit means is connected to an inlet side of the blower of the cooling medium circulating line.

3. The fuel cell power system according to claim 1 wherein the second valve means, when opened at the start of operation, permits the hydrogen-rich gas generated by the fuel conditioning means to be supplied to the cooling medium circulating line as a heating medium until the fuel cell stack is heated up to a temperature at which the fuel cell reaction is initiated.

4. The fuel cell power system according to claim 1 wherein the first valve means permits a part of the hydrogen-rich gas in the cooling medium circulating line to be supplied to the fuel gas feed line when the load is rapidly increased.

* * * * *